United States Patent
Lambert et al.

(10) Patent No.: US 6,618,073 B1
(45) Date of Patent: Sep. 9, 2003

(54) APPARATUS AND METHOD FOR AVOIDING INVALID CAMERA POSITIONING IN A VIDEO CONFERENCE

(75) Inventors: Michael G. Lambert, Austin, TX (US); Pi Sheng Chang, San Jose, CA (US)

(73) Assignee: VTEL Corporation, Austin, TX (US)

( * ) Notice: Subject to any disclaimer, the term of this patent is extended or adjusted under 35 U.S.C. 154(b) by 0 days.

(21) Appl. No.: 09/187,202

(22) Filed: Nov. 6, 1998

(51) Int. Cl.[7] .................. H04N 5/232; H04N 7/14
(52) U.S. Cl. ................. 348/14.08; 348/14.05; 348/14.16; 348/211.6
(58) Field of Search ................ 348/14.05, 14.08, 348/14.16, 211, 552, 211.6

(56) References Cited

U.S. PATENT DOCUMENTS

| | | | |
|---|---|---|---|
| 5,581,620 A | | 12/1996 | Brandstein et al. ........... 381/92 |
| 5,737,431 A | | 4/1998 | Brandstein et al. ........... 381/92 |
| 5,742,329 A | * | 4/1998 | Masunaga et al. ............ 348/15 |
| 5,778,082 A | * | 7/1998 | Chu et al. .................... 348/15 |
| 5,900,907 A | * | 5/1999 | Malloy et al. ................ 348/14 |
| 5,959,667 A | * | 9/1999 | Maeng .................... 348/14.08 |
| 5,963,250 A | * | 10/1999 | Parker et al. ............. 348/14.05 |
| 6,185,152 B1 | * | 2/2001 | Shen ......................... 367/118 |
| 6,192,342 B1 | * | 2/2001 | Akst .......................... 704/275 |
| 6,469,732 B1 | * | 10/2002 | Chang ..................... 348/14.01 |

FOREIGN PATENT DOCUMENTS

| | | | | |
|---|---|---|---|---|
| JP | 01140884 A | * | 5/1989 | ............ H04N/7/14 |
| JP | 05091503 A | * | 4/1993 | ............ H04N/7/14 |

OTHER PUBLICATIONS

"Performance of 3D Speaker Localization Using a Small Array of Microphones", Pi Sheng Chang, Alan N. Willson, Jr., unknown publisher, unknown date, 5 pages.

* cited by examiner

Primary Examiner—Wendy R. Garber
Assistant Examiner—Lin Ye
(74) Attorney, Agent, or Firm—Hamilton & Terrile, LLP; Robert W. Holland (57) ABSTRACT

A method for avoiding invalid camera positioning in a video conference establishes a boundary within the view of a camera, such that when a request is made to direct the camera to a point outside of the boundary, the camera positioning module transforms the request to one requesting the camera to be directed to a point just within the boundary. In one embodiment, the boundary includes a maximum extent and a minimum extent, corresponding respectively to the maximum and the minimum expected heights of a speaker.

16 Claims, 11 Drawing Sheets

Solution for the set $y_1, y_3, y_4$ $$a1 := \left\{ y = \frac{1}{4} \frac{-4\%1\, y1 + 2\%1\, y3 - 2y1^2 + y3^2 - 2d^2 - 2L^2}{d} \right\}$$

$$x = -\frac{1}{4} \frac{y3(y3 + 2\%1)}{L} , z = \frac{1}{2} \frac{L1^2 - y4^2 - 2y4\, y1 - 2y4\%1}{L1}$$

$\%1 := \text{RootOf}(((16\, y1^2 L^2 L1^2 - 16\, y1\, y3\, L^2 L1^2 + 4\, y3^2 L^2 L1^2 + 16\, d^2 L^2 y4^2$
$+ 4\, d^2 y3^2 L1^2 - 16\, d^2 L^2 L1^2)\_Z^2 + (-8\, y1^2 y3\, L^2 L1^2 - 8\, y3^2 y1\, L^2 L1^2$
$+ 16\, y1^3 L^2 L1^2 + 16\, y1\, L^4 L1^2 + 4\, y3^3 L^2 L1^2 - 16\, d^2 y4\, L^2 L1^2$
$+ 4\, d^2 y3^3 L1^2 - 8\, d^2 y3\, L^2 L1^2 - 8\, L^4 y3\, L1^2 + 16\, d^2 L^2 y4^3$
$- 16\, d^2 y1\, L^2 L1^2 + 32\, d^2 L^2 y4^2 y1)\_Z + 8\, y1^2 L^4 L1^2 + 4\, d^2 L^2 y4^4$
$- 1\, y1^2 y3^2 L^2 L1^2 - 8\, y1^2 y3^2 d^2 L^2 L1^2 - 4\, y3^2 d^2 L^2 L1^2 - 8\, d^2 y4^2 L^2 L1^2$
$- 16\, d^2 y4\, y1\, L^2 L1^2 + 4\, y1^4 L^2 L1^2 + 4\, y3^2 L^4 L1^2 + y3^4 L^2 L1^2$
$+ 8\, d^2 L^4 L1^2 + 4\, d^4 L^2 L1^2 + 4\, d^2 L1^4 L^2 + d^2 y3^4 L1^2 + 4\, L^6 L1^2$
$+ 16\, d^2 L^2 y4^3 y1 + 16\, d^2 L^2 y4^2 y1^2)$

*FIGURE 8a*

Solution for the set $y_2, y_3, y_4$ $$a1 := \left\{ z = \frac{1}{2} \frac{L1^2 - y4^2 + 2y4 \, y^2 - 2y4 \, \%1}{L1}, \right.$$

$$y = \frac{1}{4} \frac{-2\%1 \, y3 + 4\%1 \, y2 + y3^2 - 2d^2 - 2y2^2 - 2L^2}{d}, \quad x = \frac{1}{4} \frac{y3 \, (y3 - 2\%1)}{L} \right\}$$

$\%1 := \text{RootOf}((16d^2L^2y4^2 - 16d^2L^2L1^2 + 4y3^2L^2L1^2 - 16y3y2L^2L1^2$
$+ 16 y2^2L^2L1^2 + 4d^2y3^2L1^2)\_Z^2 + (16 d^2y2L^2L1^2 + 8y3^2y2L^2L1^2$
$+ 8y2^2y3L^2L1^2 + 8L^4y3L1^2 - 16d^2L^2L1^2y4 + 8d^2y3L^2L1^2$
$+ 16d^2L^2y4^3 - 16y2^3L^2L1^2 - 32d^2L^2y4^2y2 - 4y3^3L^2L1^2$
$- 16L^4y2L1^2 - 4d^2y3^3L1^2)\_Z + 4d^2L^2L1^4 - 4y3^2d^2L^2L1^2$
$- 8d^2L^2L1^2y4^2 + 16 d^2L^2L1^2y4 \, y2 - 4y3^2L^4L1^2 - 16d^2L^2y4^3y^2$
$+ 8d^2L^4L1^2 + 16 d^2L^2y4^2y2^2 + 8y2^2L^4L1^2 + 4y2^4L^2L1^2 + 4d^2L^2y4^4$
$+ 4L^6L1^2 + d^2y3^4L1^2 - 4y3^2y2^2L^2L1^2 + 4d^4L^2L1^2 + y3^4L^2L1^2$
$- 8d^2y2^2L^2L1^2)$

APPARATUS AND METHOD FOR AVOIDING INVALID CAMERA POSITIONING IN A VIDEO CONFERENCE

BACKGROUND OF THE INVENTION

1. Field of the Invention

The present invention relates to video teleconference technology. In particular, the present invention relates to voice-activated tracking by a camera of a speaking participant of a video teleconference.

2. Discussion of the Related Art

One feature desired in a video teleconference equipment is the ability to automatically steer the camera to a participant when he or she speaks. Clearly, before the camera can be steered, it is necessary to locate the speaking participant ("speaker") based on detection of his or her voice, and rejecting noise resulting, for example, from multiple paths and interference from other noises in the environment.

Speaker location is typically achieved by processing the sound received at a large number of microphones, such as disclosed in U.S. Pat. No. 5,737,431. One conventional method is based on estimations of "time delays of arrival" (TDOA) of the same sound at the microphones, modeling the sound source as a point source with circular wavefronts. A second method is based upon a TDOA estimation at each pair of microphones, modeling the sound source as a far field source with planar wavefronts. In that second method, each TDOA estimate provides the direction of sound with respect to a pair of microphones, such as described in U.S. Pat. No. 5,778,082. Typically, regardless of the method used, to accurately determined the location of the speaker, a large number of microphones have to be employed to allow an optimization step (e.g., a least-square optimization) to estimate the location of the speaker. Under the prior art methods, four microphones are insufficient to reliably estimate the speaker location.

Once the position of the speaker is determined, a camera is steered towards the location. Unfortunately, because of noise and the acoustics of the environment, the position determined can vary constantly, which can result in undesirable camera movements. One solution, which is described in copending patent application, entitled "Voice-activated Camera Preset Solution and Method of Operation", by Joon Maeng Ser. No. 08/647,225, filed on May 9, 1996, zooms out to cover a larger area when the speaker position is found to alternate between two adjacent regions. In addition, reflections from the ceiling, floor, the walls, and table-tops also create false source locations. Camera shots of table tops or the floor resulting from false source locations can be annoying.

SUMMARY OF THE INVENTION

The present invention provides a method for avoiding invalid positioning of a camera in a video conference. The method of the present invention includes: (a) establishing a boundary outside of which the camera is prohibited from being focused; (b) receiving a new position for focusing the camera, the new position corresponding to a position of an active speaker; (c) determining if said new position is outside of the boundary; and (d) directing the camera to the new position, when the new position is within the boundary, and directing the camera to an adjusted position within the boundary, when the new position is outside of the boundary.

In one embodiment, the boundary includes a maximum vertical extent and a minimum vertical extent corresponding respectively to expected maximum and minimum heights of a speaker. In that embodiment, when the new position is above the maximum vertical extent, the adjusted position is at or below the maximum vertical extent. Similarly, when the new position is below the vertical extent, the adjusted position is at or above said minimum vertical extent. Further, a second boundary outside of said first boundary can be established. When the new position is outside the second boundary, the new position is disregarded, and the camera is not redirected.

In one embodiment, the present invention is applied to a video conference system. The video conferencing system includes: (a) a number of microphones and a camera positioned in a predetermined configuration, each microphone providing an audio signal representative of sound received at the microphone; (b) a position determination module which provides, based on the audio signals of the microphones and the predetermined configuration, a new position of said sound source; and (c) a camera control module directing the camera towards the sound source using the new position of the sound source. In that system, when the new position corresponds to a position outside a predetermined boundary, the camera control module directs the camera to an adjusted position within said boundary.

The present invention is better understood upon consideration of the detailed description below and the accompanying drawings.

DETAILED DESCRIPTION OF THE PREFERRED EMBODIMENTS

The present invention provides a method and an apparatus which can reliably track a speaker in a video conference based upon detection of the speaker's voice, using an array of microphones having as few as four microphones.

Figure 1:
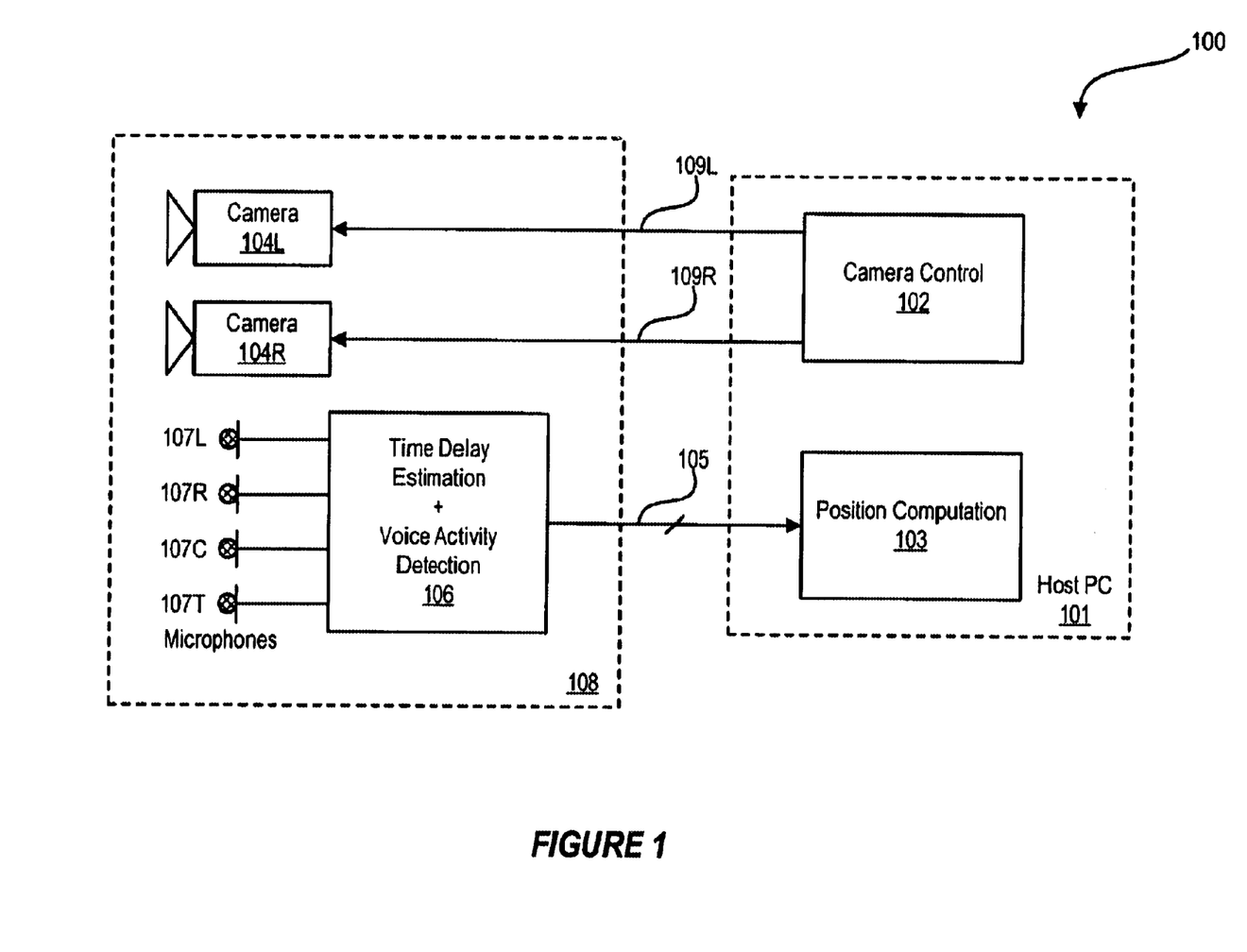
FIG. 1 shows an embodiment of the present invention in video teleconference system 100.

One embodiment of the invention is illustrated by video conference system 100 of FIG. 1. As shown in FIG. 1, video teleconference system includes host computer 101 and data acquisition system 108. Data acquisition system 108 includes cameras 104L and 104R, and microphones 107L, 107R, 107T and 107C. Sounds received at microphones 107L, 107R, 107T and 107C are processed and sampled in a time delay estimation and voice activity detection module 106 to provide position data over bus 105 for analysis in host computer 101. Time delay estimation and voice activity detection module 106 can be provided, for example, by a digital signal processor implementing one of a number of methods for determining the time delays at the microphones, or for determining directions relative to each microphone of the sound source. In this embodiment, a Cross-Power Spectrum Phase (CPSP) method, described in further detail below, is used.

Host computer 101 can be implemented by a general purpose computer, such as x86 architecture computer. As shown in FIG. 1, host computer 101 includes a position computation module 103 and camera control module 102. Position computation module 103 and camera control module 102 can be implemented in a combination of software and hardware. For example, the TDOA data on bus 105 can be received over a communication port into the memory of host computer 101. This TDOA data can then be used by position computation module 103 to determine the location of a speaking participant (speaker), which is then provided to camera control module 102. Camera control module 102 can be provided by an application program. The output data of camera control module 102 can be provided over output ports 109L and 109R to provide control signals to the steering mechanisms of cameras 104L and 104R.

Figure 2:
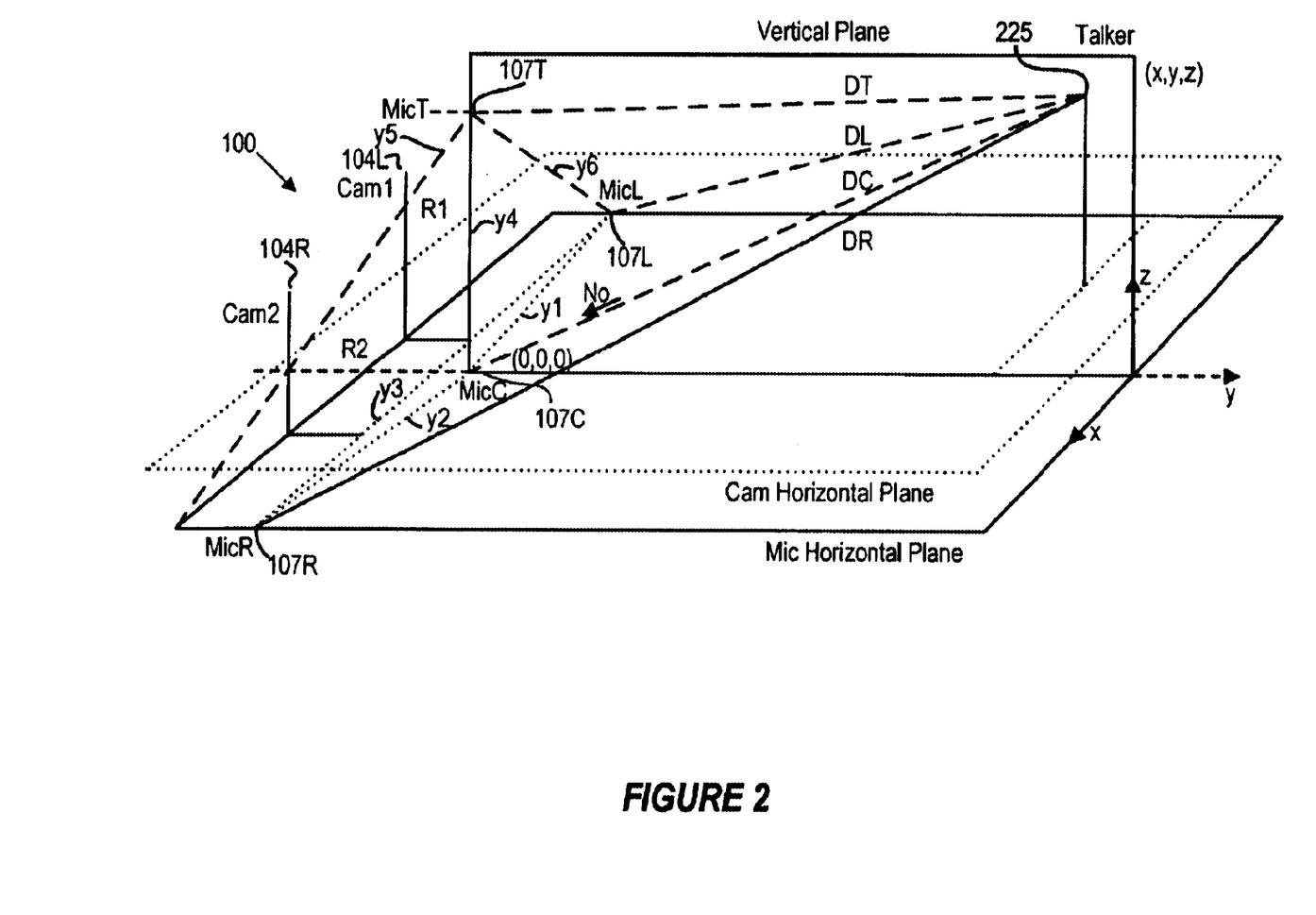
FIG. 2 shows a Cartesian coordinate system 150 used in conjunction with video teleconference system 100 to illustrate the present invention.

To facilitate the illustration of the present invention, a Cartesian coordinate system 150 shown in FIG. 2 is provided. The origin (0, 0, 0) of Cartesian coordinate system 150 is assigned at microphone 107C. Relative to the origin, cameras 104L and 104R are located at (−e, −d−f, $e_1$) and (e, −d−f, $e_1$), and microphones 107T, 107L and 107R are located at (0, 0, $L_1$), (−L, −d, 0) and (L, −d, 0) That is, microphones 107L and 107R are located a distance L on either side of microphone 107C in the −x or x direction, and a distance d from microphone 107C in the −y direction. Microphone 107T is located at a height $L_1$ above microphone 107C. Similarly the cameras are located at a distance of e on either side of microphone 107C in the x direction, and a distance of −f behind the microphones 107R and 107L in the −y direction, and a distance $e_1$ above microphone 107C in the z direction. The location of the speaker's voice is represented in FIG. 2 by the position (x, y, z).

Figure 3:
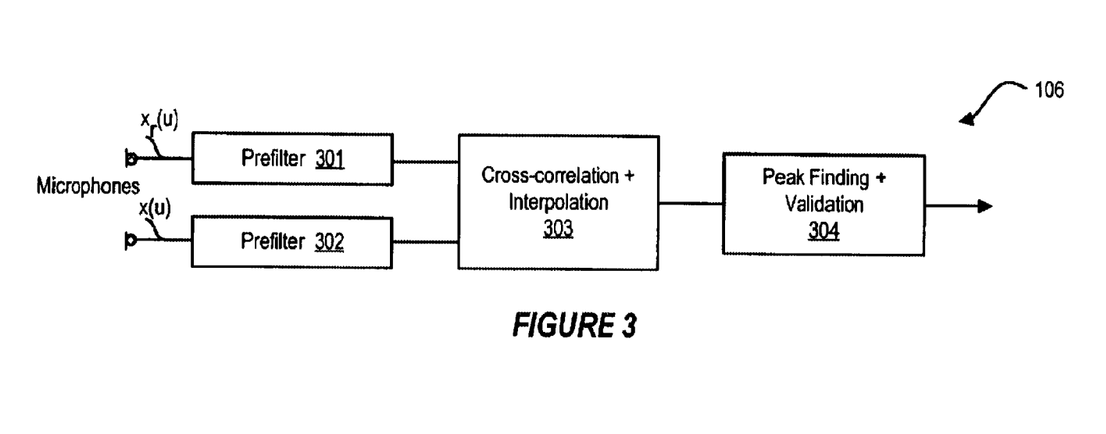
FIG. 3 is a block diagram representing the functions of time delay estimation and voice activity detection module 106 of FIG. 1.

FIG. 3 is a block diagram representing the functions of time delay estimation and voice activity detection module 106. As shown in FIG. 3, digitized signals x(n) and $x_r(n)$ from two of microphones 107L, 107R, 107C and 107T are first prefiltered by prefilters 301 and 302, and a cross-correlation of these signals are then computed in cross-correlation and interpolation module 303. Prefiltering "whitens" signals x(n) and $x_r(n)$ to enhance the output power of the cross-correlation function, by equalizing noise outside of the frequencies of interest. Usually, prefiltering is achieved using a high pass filter. Interpolation is performed on the cross-correlation function to enhance resolution. The result of the cross-correlation function is then provided to peak finding and validation module 304 to detect the peak of the cross-correlation function. The peak is validated if it exceeds a relative threshold, and satisfies a "sharpness" criterion. The relative delay between the received signals at the microphones, and hence the difference in distance between each microphone and the voice source ("range difference"), can then be calculated.

Figure 4:
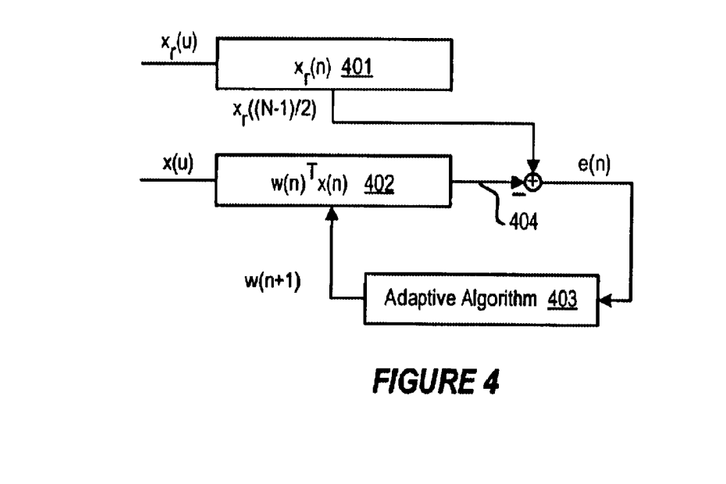
FIG. 4 shows an alternative approach to computing time delay using an adaptive filter 402.

Alternatively, the time delay between receptions of the voice signal at the microphones can also be estimated using an adaptive filter approach as shown in FIG. 4. As shown in FIG. 4, an adaptive filter 402 is applied to signal x(n) to provide an output filtered signal at terminal 404. The difference between input signal $x_r(n)$ and the filtered signal at terminal 404 provides an error signal e(n) which is used by an adaptive algorithm to optimized the coefficients of adaptive filter 402. The optimized coefficients of adaptive filter 402 can be used to derive the time delay between receptions of voice signals at a microphone pair.

Figure 5:
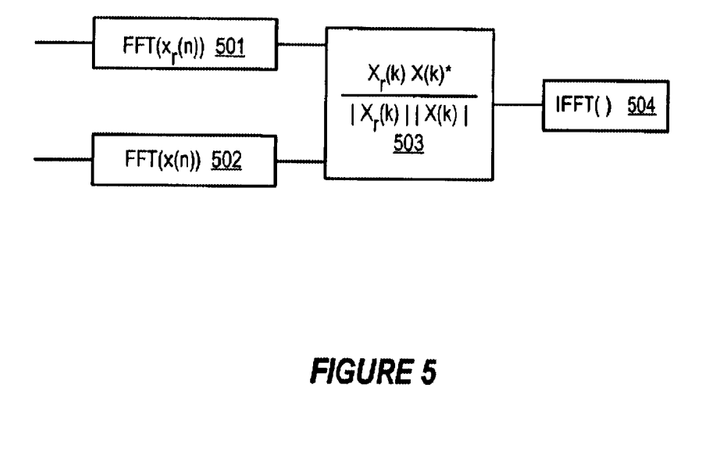
FIG. 5 shows the steps of a Cross-Power Spectrum Phase (CPSP) computation.

The prefiltering and cross-correlation computations of FIG. 3 can be performed efficiently in the frequency domain. FIG. 5 illustrates the frequency domain approach using CPSP. As shown in FIG. 5, the fast Fourier transforms (FFTs) X(k) and $X_r(k)$ of the input signals x(n) and $x_r(n)$, respectively, are multiplied and normalized to obtained output frequency-domain function Y(k):

$$Y(k) = \frac{X_r(k)X^*(k)}{|X_r(k)||X^*(k)|}$$

Figure 6:
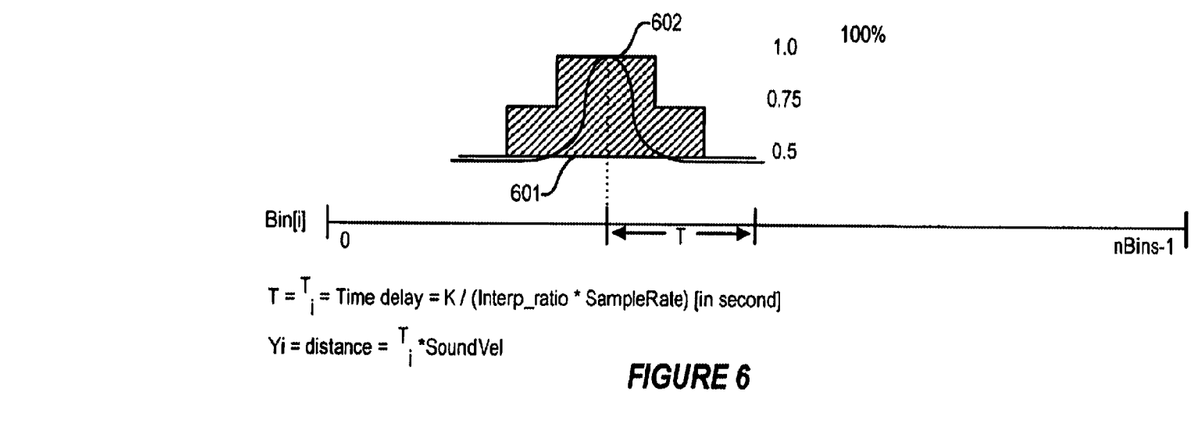
FIG. 6 shows a plot of the time-domain cross-correlation coefficients resulting from a CPSP computation.

The time-domain cross-correlation function y(n) can be obtained by an inverse fast Fourier transform (IFFT). An example of a typical waveform of function y(n) is shown in FIG. 6 as waveform 601. In this embodiment, a peak is validated if the portion of its coefficients above 50% of the peak value occurs within a predetermined number of sampling points. In this embodiment, for example, a "window" 602 (shaded area) can be used to detect the peak: if the cross-correlation function y(n) falls completely within the shaded area of window 602, a peak is detected. The relative delay is represented by the number of samples K between the peak of y(n) and sampling point (N/2+1), where N is the total number of points of the interpolated cross-correlation function. Thus, the time delay T is given by:

$$T = \frac{K}{(R*S)}$$

where R is the interpolation ratio and S is the sampling rate. The range difference y is provided by y=T*C, where C is the velocity of sound.

With four microphones, six range differences corresponding to six microphone-pairs, designated $y_1$ (microphones 107C-107L), $y_2$ (microphones 107C-107R), $y_3$ (microphones 107R-107L), $y_4$ (microphones 107C-107T), $y_5$ (microphones 107T-107L), and $y_6$ (microphones 107T-107R) can be computed. Given the Cartesian coordinate system of FIG. 2, the distances $D_T$, $D_L$, $D_C$, and $D_R$ between each of microphone 107T, 107L, 107R and 107C and the speaker at (x, y, z) are given by:

$$D_T = \sqrt{x^2 + y^2 + (z - L_1)^2} \quad (1)$$

$$D_L = \sqrt{(x+L)^2 + (y+d)^2 + z^2} \quad (2)$$

$$D_C = \sqrt{x^2 + y^2 + z^2} \quad (3)$$

-continued $$D_R = \sqrt{(x-L)^2 + (y+d)^2 + z^2} \quad (4)$$

Since, by definition:

$$y_1 = D_C - D_L \quad (5)$$

$$y_2 = D_R - D_C \quad (6)$$

$$y_3 = D_R - D_L \quad (7)$$

$$y_4 = D_T - D_C \quad (8)$$

$$y_5 = D_T - D_L \quad (9)$$

$$y_6 = D_T - D_R \quad (10)$$

Figure 7:
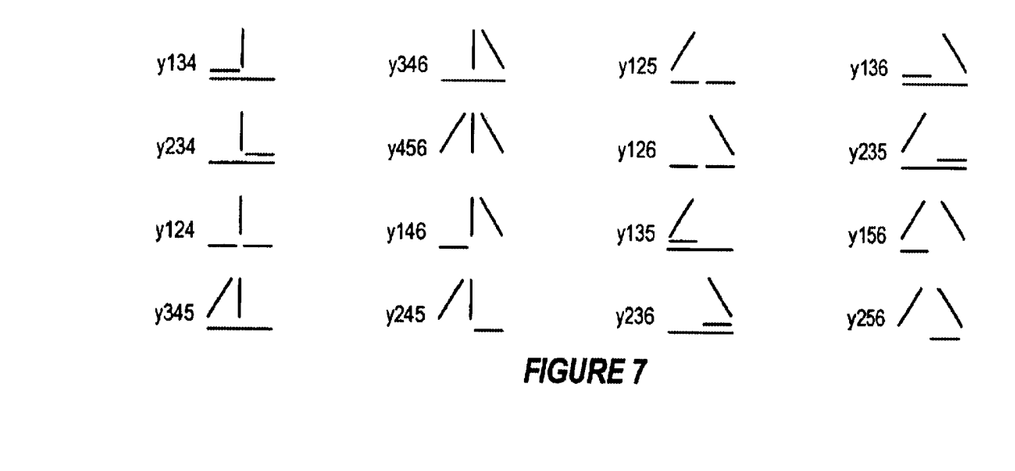
FIG. 7 shows 16 configurations each representing three range differences obtained from pairs of microphones 107T, 107R, 107C and 107L.

The location (x, y, z) of the speaker can be solved using equations (1)–(4) and any group of three simultaneous equations selected from equations (5)–(10), provided that the group of simultaneous equations selected involves all four distances $D_T$, $D_L$, $D_C$, and $D_R$. There are 16 such equation groups, which are graphically shown in FIG. 7. In FIG. 7, $y_{abc}$ represents the equation group including range differences $y_a$, $y_b$, and $y_c$, where a, b and c are different integers from 1–6. Next to each $y_{abc}$ is provided a graphical representation of the three range differences selected. For example, $y_{136}$, which denotes the equation group including range differences $y_1$, $y_3$, and $y_6$, is graphically represented by lines joining microphones 107L and 107R (long horizontal line), 107C and 107L (short horizontal line) and 107R and 107T (sloping line).

Figure 8A:
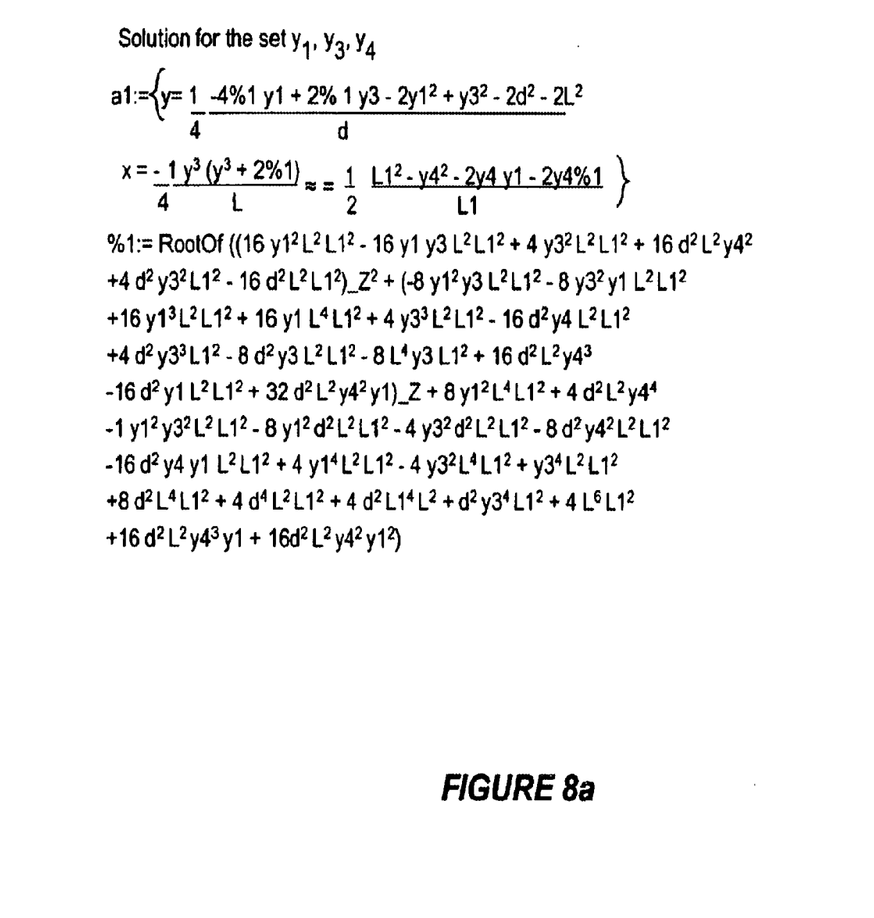
FIGS. 8a and 8b show the analytical solutions for speaker location (x, y and z) solved using equation groups $Y_{134}$ and $Y_{234}$, respectively.
Figure 8B:
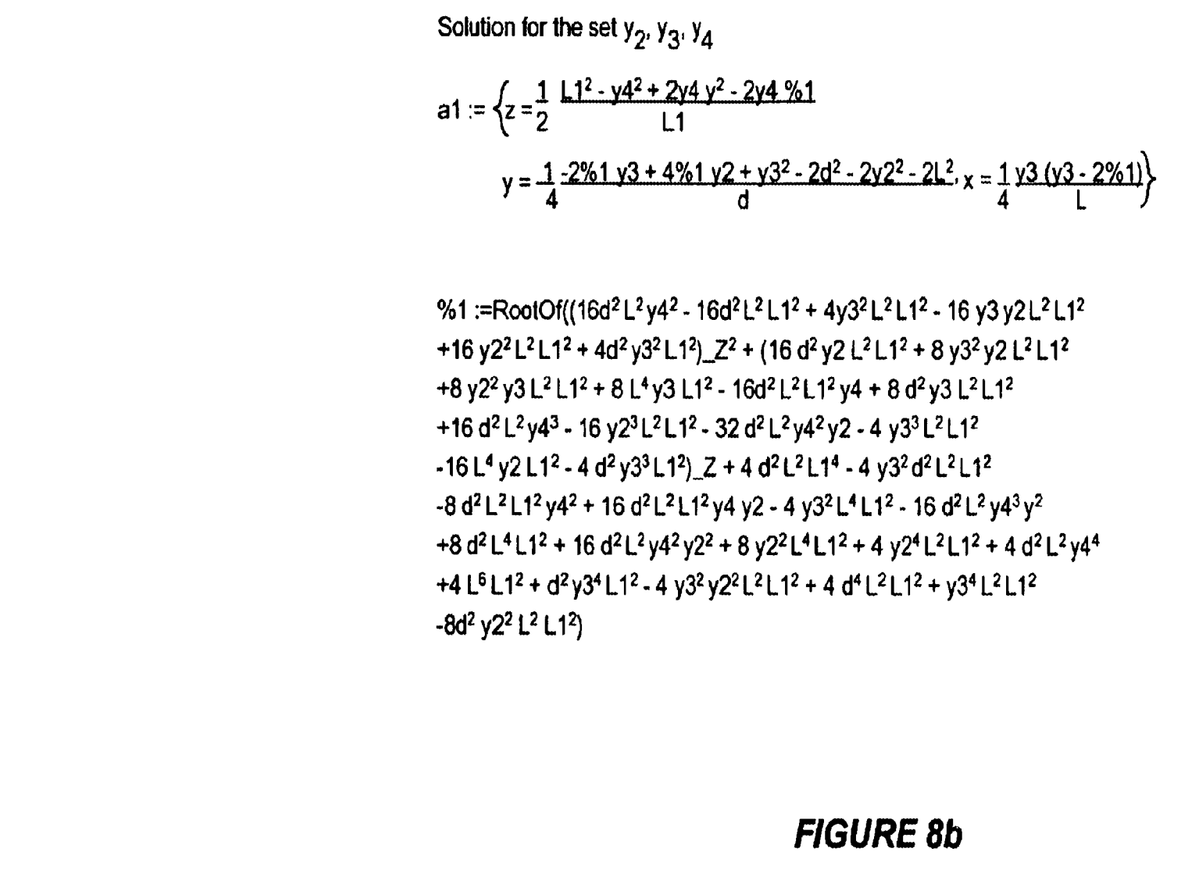

To avoid solving the 16 sets of seven simultaneous equations at run time, the analytical solution for each set can be obtained off-line, for example, using the symbolic mathematical package MAPLE. These off-line solutions can then be implemented as software in position computation module 103. To illustrate, FIGS. 8a and 8b show the analytical solutions for speaker location (x, y and z) solved using equation groups $y_{134}$ and $y_{234}$, respectively.

Some of the speaker positions obtained can correspond to non-physical solutions (e.g., positions behind the camera, outside the room, etc.), or noise. These solutions are eliminated based on prior knowledge of the environment. Prior knowledge of the environment's acoustics and furniture may also be used to eliminate other solutions. For example, if the solution correspond to a position at or below the table top, the sound may not correspond to a voice (e.g., sounds due to collecting papers on a desk, or sounds due to leg movements under a desk). As another example, if the position correspond to a point beyond the range covered by either of cameras 104L and 104R, that solution can also be eliminated as unhelpful information.

In this embodiment, from each solution for location (x, y, z), a "radius" $r_i$, corresponding to the radial distance of the solution $(x_i, y_i, z_i)$ from microphone 107C, is computed. The radius $r_i$ is given by:

$$r_i = \sqrt{x_i^2 + y_i^2 + z_i^2}$$

After eliminating the undesired solutions, the remaining radii $r_i$'s are arranged in increasing or decreasing order, and an average a is computed. The average a can be a weighted average to provide additional weight to, for example, range difference $y_3$, which may correspond to a pair of microphones placed the furthest distance apart, thus tending to be more reliable. A selection function can be applied to choose between the position corresponding to the median radius or the weight average. Other variations to arrive at a final position among the solutions for location (x, y, z) are also possible. For example, the final position can be obtained by discarding the redetermined number of furthest ($p_1$) and closest ($p_2$) solutions, and taking a weighted average of the remaining solutions.

Figure 10A:
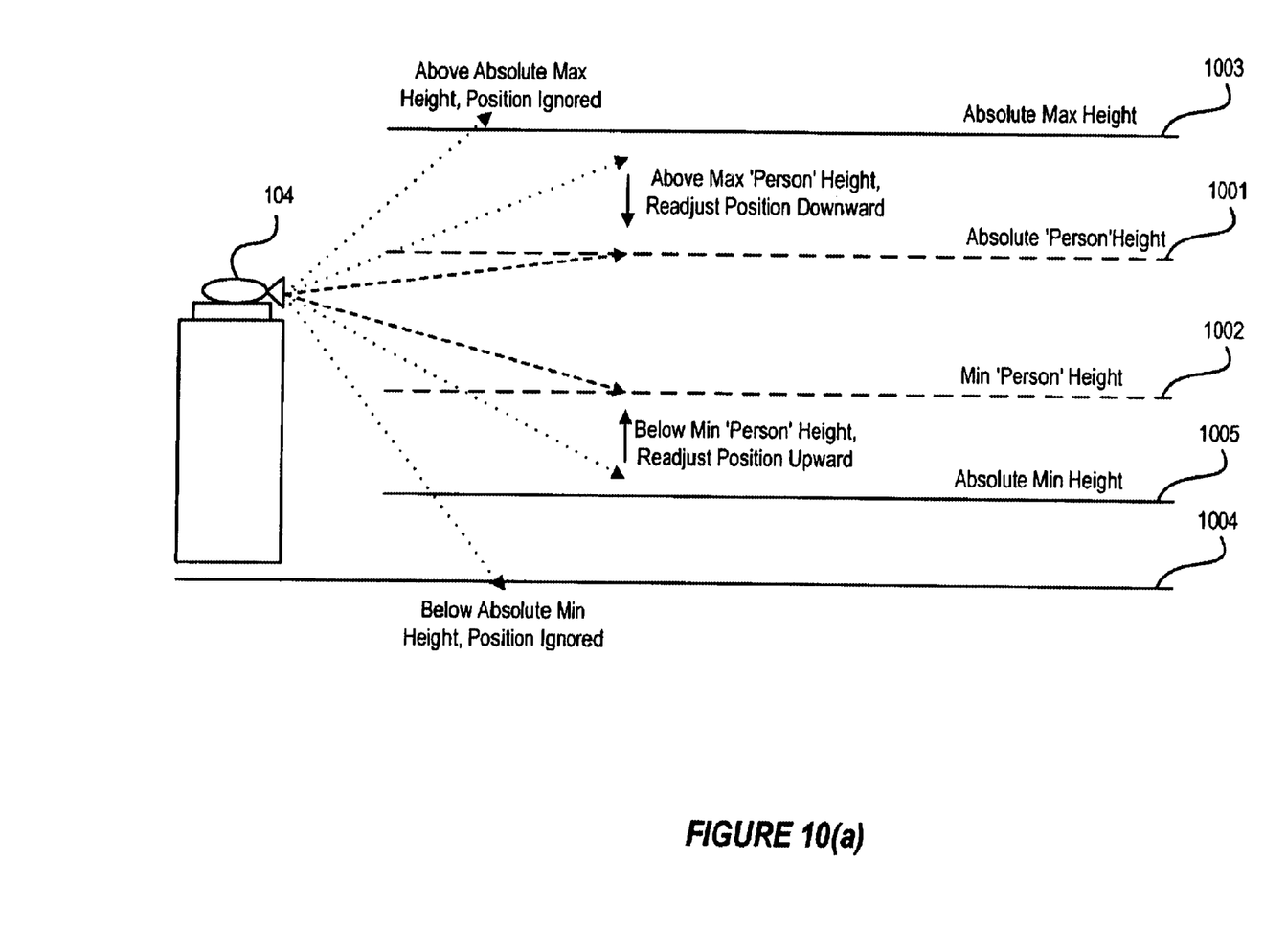
FIGS. 10(a) and 10(b) illustrate a method for adjusting detected speaker position to minimize steering a camera to a erroneously calculated sound source position.

The final position is then used by camera control module 102 to provide control signals at terminals 109L and 109R to cameras 104L and 104R. Although not necessary for practicing the present invention, this embodiment is described in conjunction with a two-camera configuration. With two cameras, images can continued to be transmitted from the previous position by one camera, while the other camera is steered to point at the new position. After the second camera has completed its travel and focused on the new position, images can then be transmitted from the second camera, thereby avoiding transmitting images of the camera's travel. Since images by a moving camera often cannot be efficiently encoded, and thus wastes encoding bandwidth over images of little or no interest, the two camera system efficiently use the available bandwidth by transmitting only images of interest. As mentioned above, because of the acoustics in the environment, a false source location can lead to clearly erroneous camera shots of the ceiling, a table top or the floor. The present invention provides a method which avoids these clearly erroneous shots. This method is illustrated in conjunction with FIGS. 10(a) and 10(b). In FIG. 10(a), camera 104 is positioned at a known height above floor 1004 in a room having a ceiling 1003. It is assumed that a sound source found located above ceiling 1003 or below a minimum height 1005 is of no practical interest. Thus, position computation module 103 above is programmed to discard solutions found above ceiling 1003 (e.g., 8 feet) or below minimum height 1005 (e.g., 1 foot). Further, in a video conference application, where the interesting sound sources are the speaking participants, the present invention assumes as valid only sound sources locating between predetermined minimum and maximum "person" heights (e.g., 3.5 feet to 5.5 feet above the floor, respectively, for sitting participants) typical at video conferences, indicated by horizontal lines 1002 and 1001, respectively. The minimum person height 1002 is selected to be higher than any table tops within the room, so as to avoid table top shots.

When a sound source is found between minimum person height 1002 and minimum height 1005, the position calculated by position computation module 103 for the sound source is adjusted upward to the level of minimum person height 1002. Similarly, when a sound source is found between ceiling 1003 and maximum person height 1001, the position calculated by position computation module 103 is adjusted downwards to the maximum person height 1001. In either case, the adjusted position is provided to camera control module 102 for steering camera 104 to a suitable camera orientation.

Figure 10B:
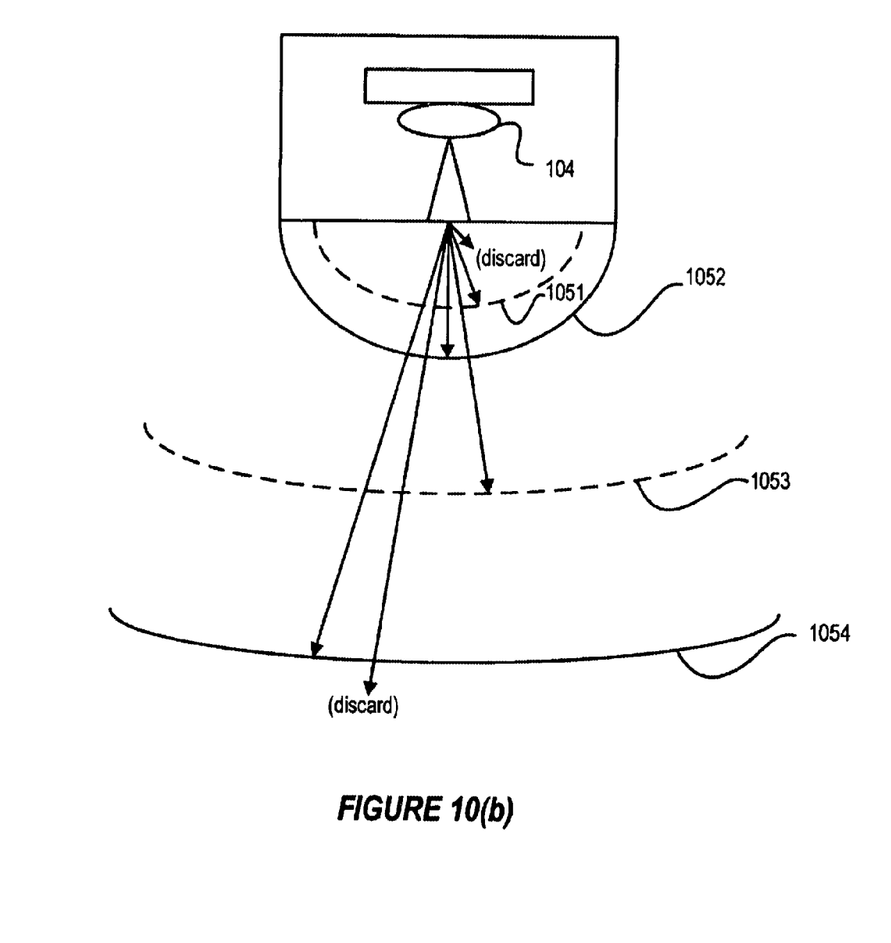

In this embodiment also, camera positions are also adjusted for the expected distance between the speaking participant and camera 104, as illustrated by FIG. 10(b). In FIG. 10(b), radial distances 1051, 1052, 1053 and 1054 represent, as measured from camera 104, a minimum focusing distance, a minimum expected distance of a speaker, a maximum expected distance of a speaker, and the maximum distance of interest, respectively. Position computation module 103 discards positions beyond radial distance 1054 (e.g., 26 feet) away. Further, when the position computed by position computation module 103 is between radial distance 1054 and radial distance 1053, i.e., the speaker is within the maximum distance of interest, but beyond the maximum expected distance of the speaker (e.g., 20 feet), the calculated position of the speaker is adjusted to radial distance 1053. In this embodiment, radial distance 1053 is approximately 20 feet. Similarly, when the position computed by position computation module 103 for the speaking participant is within radial distance 1051 and radial distance 1052, i.e., the speaker is beyond the minimum focusing distance but less than the minimum expected distance of a speaker, the calculated position of the speaker is adjusted to radial distance 1052. In this embodiment, radial distances 1051 and 1052 are, respectively, 1 foot and 5 feet. A calculated position of the speaker which is less than radial distance 1051 is discarded.

Figure 11A:
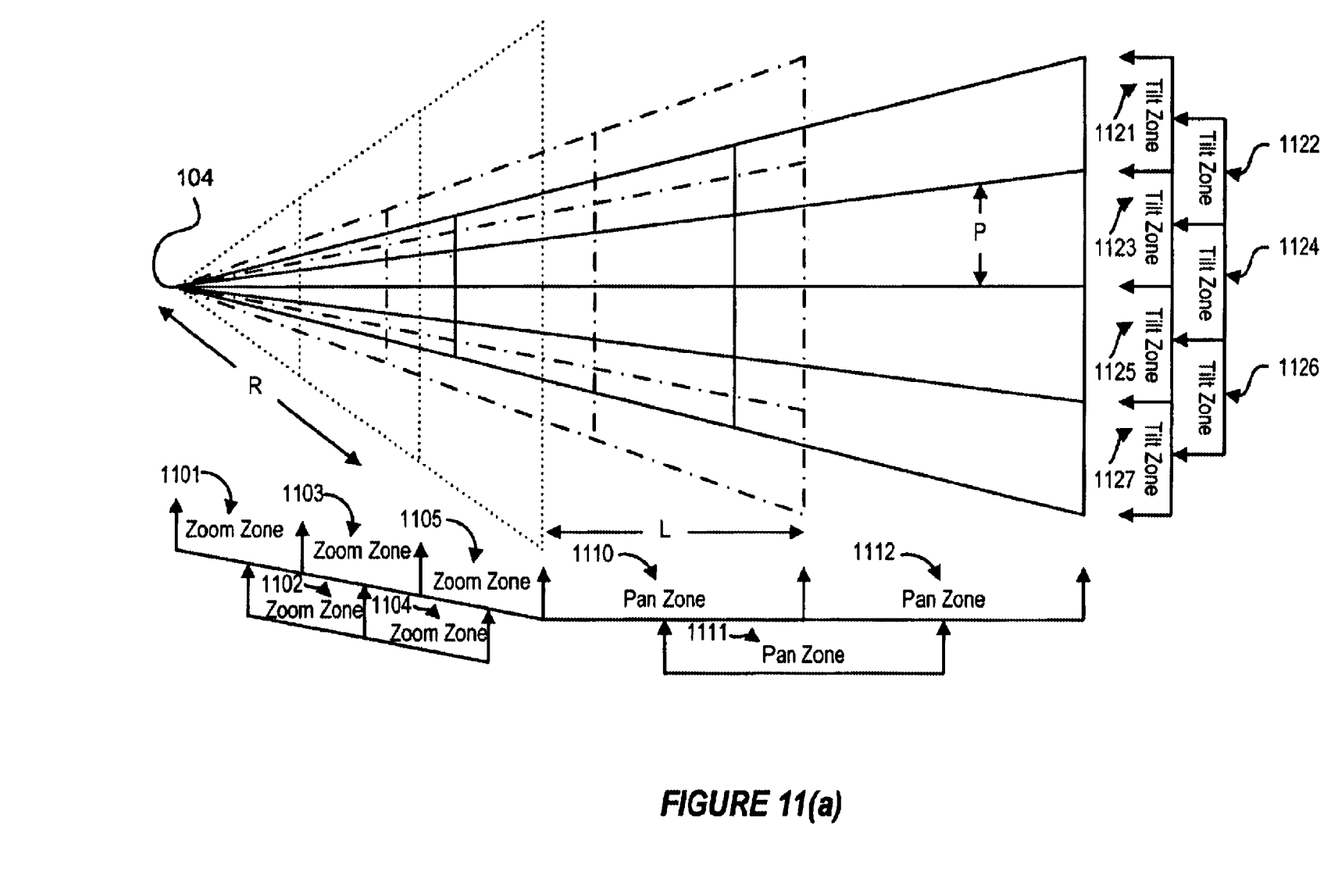
FIGS. 11(a) and 11(b) illustrate a method for minimizing undesirable camera movements, by dividing the field seen by a camera into 3-dimensional zones.
Figure 11B:
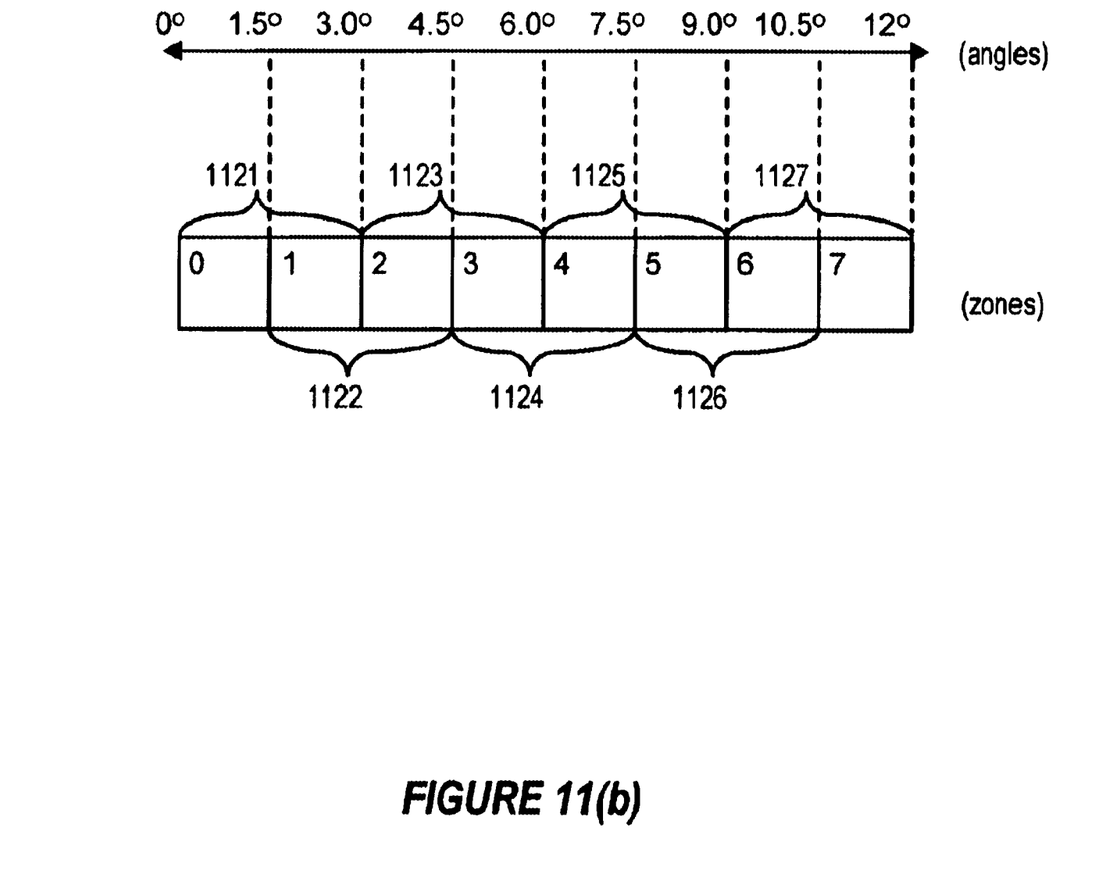

In addition to the above camera control method, the present invention provides another method for camera control, which minimizes undesirable camera movements. According to this method for minimizing undesirable camera movements, which is illustrated in conjunction with FIGS. 11(*a*) and 11(*b*), each camera's view is divided into 3-dimensional zones. These zones, which are based on angular camera movements in orthogonal directions (i.e., the "pan" and "tilt" angles), and the radial distance of the focal plane (characterized by the "zoom" angle, illustrated in FIG. 9), are used in determining a new camera position, while minimizing undesirable constant camera movements. As shown in FIG. 11(*a*), the field of camera 104 is divided into overlapping "zoom zones" 1101–1105, according to radial distance from camera 104. Similarly, the field of camera 104 is divided along the horizontal and vertical directions into overlapping "pan" and "tilt" zones 1110–1112 and 1121–1127, respectively. FIG. 11(*b*) shows one implementation of "tilt" zones 1121–1127. As shown in FIG. 11(*b*), zone 1121 spans the range of angles between 0 and 3.0 degrees and zone 1122 spans the range of angles between 1.5 degrees and 4.5 degrees, overlapping zone 1121 over a range of 1.5 degrees. Similarly, each of zones 1123–1127 spans a range of 3.0 degrees and overlaps an adjacent zone by a range of 1.5 degrees. In FIG. 11(*b*), zones 1121–1127 are associated respectively with indices 0–7, in increasing angular distance from 0 degrees.

In this embodiment, a method of the present invention for avoiding frequent camera movements uses a different criterion for retargeting camera 104 according to whether or not the detected source is continuously active. In one implementation, position computation module 103 provides to camera control module 102 two or three calculated positions every second on the average, when a speaker is continuously active. However, in that implementation, a slight delay of about one second is incurred when a new sound source becomes active, due to the computational complexity of the cross-correlation computation. Thus, in that implementation, if successive positions are received by camera control module 102 from position computation module 103 at one second intervals or thereabout, the voice source is considered continuously active. According to the present invention, while the sound source is continuously active, the camera trained on the sound source does not move from the current target position acquired within the last predetermined time to a new target position, unless the new target position is two or more zones away in any one of the radial or angular directions. If the zones are associated with indices in the manner illustrated by FIG. 11(*b*), a convenient method for determining the distance between the current position and the new target position is to find the differences in the zone indices of these positions. For example, referring to FIG. 11(*b*), assuming the current position of the continuously active speaker is originally at 1.3 degrees in zone 1121, i.e., left of the mid-point of zone 1121, the current speaker is associated with index 0. (Alternatively, if the current position of the speaker is at 1.8, i.e., to the right of the mid-point of zone 1121 in zones 1121 and 1122, the current position is associated with zone index 1, by convention). Now, if the next position received for the continuously active speaker is 4.9 (i.e., in zones 1123 and 1124 and associated with index 3, by virtue of its position with respect the mid-points of zones 1123 and 1124), the distance represented by the difference is zone indices is 3−0=3, thus two or more zone zones away. In this case, the camera is retargeted to the focus on the new position of the continuously active speaker.

Alternatively, if a sound source is not continuous (e.g., when a new source is located), the camera is not moved, unless the position of the current speaking participant and the new position is more than one zone away. Using the zone index method described, the camera is redirected when the difference in zone indices exceeds two, indicating the difference in positions is more than one zone away.

The angular or linear span of each zone is selected such that the image of the expected source (i.e., the speaker) occupies a reasonable portion of the zone. If the angular or zone span of each zone is selected to be too large, a participant's face may occupy only one side of the frame. Alternatively, if the angular or linear span of the zones are too small, the variability in the computed source position may result in frequent camera movements, resulting from the speaking participant's position being frequently found to move across zone boundaries.

Figure 9:
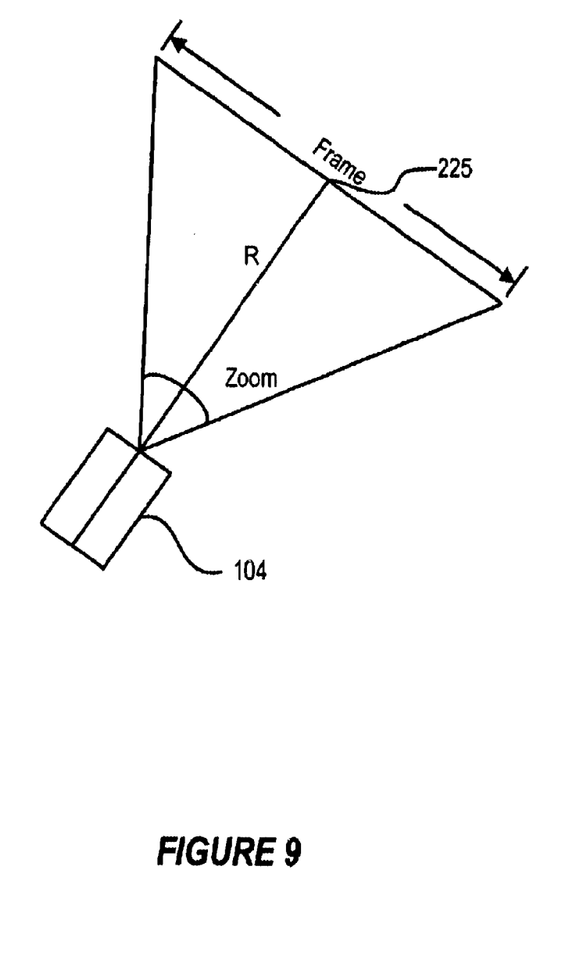
FIG. 9 shows illustrates the distance frame, which is the horizontal span covered by an image, in relation to the zoom angle zoom.

In one embodiment, the pan, tilt and zoom angles $\alpha_L$, $\gamma_L$, $\alpha_R$, $\gamma_R$, $Zoom_L$ and $Zoom_R$ of cameras 104L and 104R, respectively are given by:

$$\alpha_L = \tan^{-1}\left(\frac{y+d+f}{x+e}\right)$$

$$\gamma_L = \tan^{-1}\left(\frac{z-e_1}{\sqrt{(x+e)^2+(y+d+f)^2}}\right)$$

$$\alpha_R = \tan^{-1}\left(\frac{y+d+f}{x-e}\right)$$

$$\gamma_R = \tan^{-1}\left(\frac{z-e_1}{\sqrt{(x-e)^2+(y+d+f)^2}}\right)$$

$$Zoom_L = 2\tan^{-1}\left(\frac{frame}{2R_L}\right)$$

$$Zoom_R = 2\tan^{-1}\left(\frac{frame}{2R_R}\right),$$

where frame, $R_L$ and $R_R$ are respectively the horizontal span covered by the image to be displayed on the monitor (FIG. 9), and the weighted distances of the sound source from the left and right cameras. Weighted distances $R_L$ and $R_R$ are given by:

$$R_L = m\sqrt{(x+e)^2+(y+d+f)^2+(z-e_1)^2}$$

$$R_R = m\sqrt{(x-e)^2+(y+d+f)^2+(z-e_1)^2},$$

where m is a magnification factor.

The above detailed description is provided to illustrate the specific embodiments of the present invention and is not intended to be limiting. Numerous variations and modifications within the scope of the present invention are possible. The present invention is set forth in the following claims.

We claim:

1. In a video conference, a method for avoiding invalid positioning of a camera, comprising:

establishing a boundary outside of which said camera is prohibited from being positioned;

receiving a new position for focusing said camera, said new position corresponding to a position of an active speaker;

determining if said new position is outside of said boundary; and directing said camera to said new position, when said new position is within said boundary, and directing said camera to an adjusted position within said boundary, when said new position is outside of said boundary.

2. A method as in claim 1, wherein said boundary includes a maximum vertical extent and a minimum vertical extent corresponding respectively to expected maximum and minimum heights of a speaker.

3. A method as in claim 2, wherein when said new position is above said maximum vertical extent, said adjusted position is at or below said maximum vertical extent.

4. A method as in claim 2, wherein when said new position is below said vertical extents said adjusted position is at or above said minimum vertical extent.

5. A method as in claim 2, further including establishing a second boundary outside of said first boundary, wherein when said new position is outside said second boundary, said new position is disregarded.

6. A method as in claim 1, wherein said boundary includes a minimum radial distance and a maximum radial distance corresponding respectively to expected maximum and minimum distances of a speaker with respect to the position of the camera.

7. A method as in claim 6, wherein when said new position is less than said minimum radial distance, said adjusted position is at or beyond said minimum radial distance.

8. A method as in claim 6, wherein when said new position is greater than said maximum radial distance, said adjusted position is at or within said maximum radial distance.

9. A video conference system, comprising:

a plurality of microphones and a camera positioned in a predetermined configuration, each microphone providing an audio signal representative of sound received at said microphone;

a position determination module, based on said audio signals of said microphones and said predetermined configuration, providing a new position of said sound source; and a camera control module directing said camera towards said sound source using said new position of said sound source, when said new position corresponds to a position outside a predetermined boundary, said camera control module directs said camera to an adjusted position within said boundary.

10. A system as in claim 9, wherein said boundary includes a maximum vertical extent and a minimum vertical extent corresponding respectively to expected maximum and minimum heights of a speaker.

11. A system as in claim 10, wherein when said new position is above said maximum vertical extent, said adjusted position is at or below said maximum vertical extent.

12. A system as in claim 10, wherein when said new position is below said vertical extent, said adjusted position is at or above said minimum vertical extent.

13. A system as in claim 10, further including establishing a second boundary outside of said first boundary, wherein when said new position is outside said second boundary, said new position is disregarded.

14. A system as in claim 9, wherein said boundary includes a maximum radial distance and a minimum radial distance corresponding respectively to expected maximum and minimum radial distances of a speaker from said camera.

15. A system as in claim 14, wherein when said new position is greater than said maximum radial distance, said adjusted position is at or within said maximum radial distance.

16. A system as in claim 14, wherein when said new position is less than said radial distance, said adjusted position is at or greater than said minimum radial distance.

* * * * *